United States Patent Office 3,012,028
Patented Dec. 5, 1961

3,012,028
17α,21-EPOXY-PREGNENES
George B. Spero and Frank H. Lincoln, Jr., Kalamazoo, and William P. Schneider, Kalamazoo Township, Kalamazoo County, Mich., assignors to The Upjohn Company, Kalamazoo, Mich., a corporation of Delaware
No Drawing. Filed May 26, 1959, Ser. No. 815,791
2 Claims. (Cl. 260—239.55)

The present invention relates to steroid compounds and is more particularly concerned with 11-oxygenated 6-alkyl-9α fluoro-17α,21-epoxy-4-pregnene-3,20-dione and its 1-dehydro derivative, specially with 6α-methyl-9α-fluoro-11β-hydroxy-17α,21-epoxy-4-pregnene-3,20-dione and 6α-methyl-9α-fluoro-11β-hydroxy-17α,21-epoxy-1,4-pregnadiene-3,20-dione and a method for the preparation thereof.

The new compounds and the process of the present invention are illustratively represented by the following sequence of formulae:

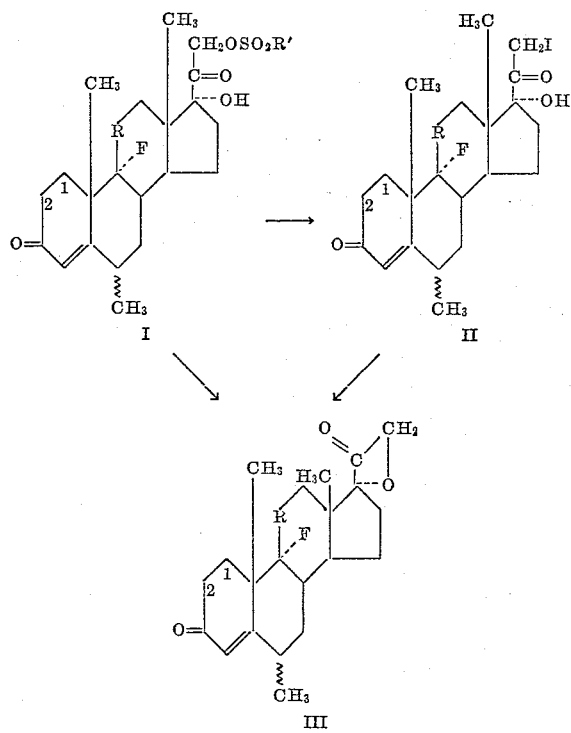

wherein R is selected from the group consisting of

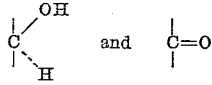

R' is selected from the group consisting of alkyls having from one to four carbon atoms, inclusive, and phenyl, and tolyl, and wherein the 1,2-linkage is selected from saturated bond and unsaturated double bond linkages.

The process of the present invention comprises: treating a selected 11-oxygenated 6-methyl-17α,21-dihydroxy-4-pregnene-3,20-dione 21-organic sulfonate, methanesulfonate, ethanesulfonate, propanesulfonate, butanesulfonate, benzenesulfonate toluenesulfonate, or the corresponding 1-dehydro compound thereof (I) with a fluorinating agent such as an alkali metal fluoride e.g. potassium fluoride, sodium fluoride or the like to give the corresponding 11-oxygenated 6-methyl-9α-fluoro-17α,21-epoxy-4-pregnene-3,20-dione (III). As in this reaction a substantial amount of 11-oxygenated 6-alkyl-9α,21-difluoro-17α-hydroxy-4-pregnene-3,20 dione is produced, or respectively, the 1-dehydro analogue thereof, it is necessary to separate the mixture by chromatography or selective recrystallizations. A better method is to convert the 21-organic sulfonate of Formula I to the corresponding 21-iodide, an 11-oxygenated 6-methyl-9α-fluoro-17α-hydroxy-21-iodo-4-pregnene-3,20-dione or respectively the 1-dehydro analogues thereof (II), and to dehydrohalogenate this compound with a base, preferably silver carbonate to give the compound of Formula III. Instead of silver carbonate, other bases or neutralizing compounds can be selected such as sodium or potassium hydroxide, calcium or barium hydroxide, sodium and potassium carbonate, sodium or potassium bicarbonates or carbonates of copper, thallous carbonate, cadmium carbonate and the like.

The compounds of structural Formula III, particularly the novel 6α-methyl-9α-fluoro-11β-hydroxy-17α,21-epoxy-4-pregnene-3,20-dione and 6α-methyl-9α-fluoro-11β-hydroxy-17α,21-epoxy-1,4-pregnadiene-3,20 dione and the corresponding 11-keto derivatives thereof are highly active diuretic compounds having in addition anti-inflammatory activity. They also show glucocorticoid activity and are active as mineralocorticoids. The compounds are therefore useful in chronic congestive heart failure, nephritic symptoms and other circulatory symptoms. Since these compounds have anti-inflammatory activity, they are particularly useful in those cases in which symptoms of arthritis co-exist with circulatory symptoms of congestive heart failure and nephrosis.

The novel compounds can be administered in the form of capsules, tablets or in any solubilized form such as suspensions and the like to produce diuresis.

A batch of 1000 capsules, each containing 250 milligrams of the 6α-methyl-9α-fluoro-11β-hydroxy-17α,21-epoxy-4-pregnene-3,20-dione, is prepared from the following ingredients:

| | Gms. |
|---|---|
| 6α-methyl-9α-fluoro-11β- hydroxy - 17α,21 - epoxy-4-pregnene-3,20-dione | 250 |
| Starch, bolted | 150 |
| Magnesium stearate | 3.5 |

The starch and magnesium stearate thoroughly mixed and the finely powdered steroid incorporated into the mixture. The resulting material is milled, screened, and filled into telescoping capsules utilizing conventional techniques.

Instead of 6α-methyl-9α-fluoro-11β-hydroxy-17α,21-epoxy-4-pregnene-3,20-dione, the 11-keto analogue thereof, 6α-methyl-9α-fluoro-17α,21-epoxy-4-pregnene-3,11,20-trione can be substituted in the above formulation.

Substituting 250 grams of 6α-methyl-9α-fluoro-11β-hydroxy-17α,21-epoxy-1,4-pregnadiene-3,20-dione or the 11-keto analogue thereof in the above formulation gives a composition similarly effective in diuretic therapy.

Starting materials of Formulas I and II such as 6α-methyl-9α-fluoro-11β,17α,21-trihydroxy -4- pregnene-3,20-dione 21-methanesulfonate, 6α-methyl-9α-fluoro-11β,17α-dihydroxy-21-iodo-4-pregnene-3,20-dione are shown in U.S. 2,867,635; and the 1-dehydro analogues thereof, 6α-methyl-9α-fluoro-11β,17α,21-trihydroxy-1,4- pregnadiene-3,20-dione 21-methanesulfonate, 6α-methyl -9α- fluoro-11β,17α-dihydroxy-21-iodo-1,4-pregnadiene-3,20 dione are shown in U.S. 2,867,635. Other starting materials such as the 11-keto derivatives thereof are prepared in like manner by reacting 6-methyl-9α-fluorocortisone or 1-dehydro-6-methyl-9α-fluorocortisone with methanesulfonyl chloride to give the corresponding 21-methanesulfonate and, if desired, thereafter with sodium iodide in acetone solution as disclosed in the before-mentioned patents for the 11β-hydroxy analogous compounds. In the same manner from 6β-methyl-9α-fluorohydrocortisone and from other 6α- and 6β-alkyl- or phenyl derivatives of 9α-fluorohydrocortisone, 1-dehydro-9α fluorohydrocortisone, 9α- fluorocortisone and 1-dehydro-9α-fluorocortisone are prepared the corresponding 21-organic sulfonates and subsequently the 21-iodo compounds.

In carrying out the process of the instant invention the selected 11-oxygenated 6-alkyl-9α-fluoro-17α,21-dihydroxy-4-pregnene-3,20-dione 21 organic sulfonate or respectively the 1-dehydro derivative thereof is heated with an anhydrous fluorinating agent such as potassium or sodium fluoride, in a suitable organic solvent such as in dimethylformamide or dimethylsulfoxide. The alkali metal fluoride such as potassium fluoride or the like is generally used in a quantity of one to ten moles per mole of steroid, preferably in an excess of four to six moles. The reaction mixture which is a suspension is stirred at a temperature between fifty degrees centigrade up to the reflux temperature of the mixture for a period of four to 48 hours to effect the conversion. After the reaction is completed, the mixture is cooled, generally by pouring into excess of water, and the solid particles are collected on filter, washed and dried. The thus obtained solid is redissolved and 11-oxygenated 6-alkyl-9α,21-difluoro-17α-hydroxy-4-pregnene-3,20-dione or the 1-dehydro analogue are separated from the corresponding 6-alkyl-9α-fluoro-17α,21-epoxy-4-pregnene-3,20-dione in known manners, preferably, by chromatography as shown in the examples.

Alternatively, an 11-oxygenated 6-alkyl-17α-hydroxy-21-iodo-4-pregnene-3,20-dione or respectively the 1-dehydro analogous compound thereof, obtained from the corresponding 21-methanesulfonate by refluxing the 21-methanesulfonate with sodium iodide in acetone, in known manner, is converted with the aid of a base to the corresponding 11-oxygenated 6-alkyl-9α-fluoro-17α,21-epoxy-4-pregnene-3,20-dione, or respectively the 1-dehydro derivative thereof. This reaction is best carried out in solution in an organic solvent such as acetonitrile or nitriles of other organic acids, such as propionic or butyric acid, and in the presence of a base such as silver carbonate, thallous carbonate, cupric and cuprous carbonates, sodium carbonate, potassium carbonate, calcium hydroxide, barium hydroxide, sodium hydroxide, potassium hydroxide or neutralizing agents such as bicarbonates of sodium or potassium or the like. The preferred base is silver carbonate, freshly precipitated by reacting silver nitrate and sodium carbonate in aqueous solution. After the silver carbonate is freshly prepared it is added to a solution of the selected 21-iodo starting materials and the suspension is heated under reflux for several hours, usually between one to four hours. After the reaction is terminated the mixture is cooled and filtered to eliminate the inorganic materials, such as silver oxides, carbonates and so on. From the filtrate, by evaporation, recrystallization and if deemed necessary, chromatography is obtained the product, an 11-oxygenated 6-methyl-9α-fluoro-17α,21-epoxy-4-pregnene-3,20-dione or, respectively, the 1-dehydro derivative thereof.

The following preparations and examples are illustrative for the processes and products of the present invention but are not to be construed as limiting.

PREPARATION 1

*6α-methyl-9α-fluoro-17α,21-dihydroxy-4-pregnene-3,11,20-trione 21-methanesulfonate*

A solution was prepared containing 200 milligrams of 6α-methyl-9α-fluorocortisone and 1-milliliter of pyridine. The solution was cooled to zero degrees centigrade and treated with a cold solution of 85 milligrams of methanesolfonyl chloride in one milliliter of pyridine. Thereafter the solution was allowed to stand at a temperature between zero and five degrees centigrade for a period of three hours. Ice and sufficient dilute hydrochloric acid to neutralize the pyridine was added and the mixture was extracted with three 25-milliliters portions of methylene chloride. The extracts were washed with cold sodium bicarbonate solution, then water and finally dried over anhydrous sodium sulfate and evaporated at reduced pressure to give crystalline 6α-methyl-9α-fluoro-17α,21-dihydroxy-4-pregnene-3,11,20-trione 21-methanesulfonate.

In the same manner as shown in Preparation 1, 6α-methyl-9α-fluoro-17α,21-dihydroxy-1,4-pregnadiene-3,11,20-trione 21-methanesulfonate was prepared by reacting the corresponding 1-dehydro-6α-methyl-9α-fluorocortisone with methanesulfonyl chloride in pyridine solution to obtain 6α-methyl-9α-fluoro-17α,21-dihydroxy-1,4-pregnadiene-3,11,20-trione 21-methanesulfonate.

PREPARATION 2

*6α-methyl-9α-fluoro-17α hydroxy-21-iodo-4-pregnene-3,11,20-trione*

Crystalline methanesulfonate of 6α-methyl-9α-fluoro-17α,21-dihydroxy-4-pregnene-3,11,20-trione (150 milligrams) obtained in Preparation 1, was dissolved in eighteen milliliters of acetone and treated with a solution of 250 milligrams of sodium iodide in six milliliters of acetone. The mixture was heated under reflux with stirring for a period of fifteen minutes, then cooled and concentrated to dryness at reduced pressure to give 6α-methyl-9α-fluoro-17α-hydroxy-21-iodo-4-pregnene-3,11,20-trione.

In the same manner as shown in Preparation 2, 6α-methyl-9α-fluoro-17α,21-dihydroxy-1,4-pregnadiene-3,11,20-trione 21-methanesulfonate is converted with sodium iodide, in acetone solution, at reflux temperature, to the corresponding 6α-methyl-9α-fluoro-17α-hydroxy-21-iodo-1,4-pregnadiene-3,11,20-trione.

EXAMPLE 1

*6α-methyl-9α fluoro-11β-hydroxy-17α,21-epoxy-4-pregnene-3,20-dione*

To a solution of 7.7 grams of 6α-methyl-9α-fluoro-11β,17α,21-trihydroxy-4-pregnene-3,20-dione 21-methanesulfonate, dissolved in 80 milliliters of dimethylsulfoxide, was added 3.8 grams of potassium fluoride. The resulting suspension was stirred and heated on the steam bath for a period of sixteen hours. The mixture was then cooled, diluted with a half liter of water and extracted with methylene chloride. The extracts were washed with water and dried. The thus obtained solid, containing 6α - methyl-9α,21-difluoro-11β,17α-dihydroxy-4-pregnene-3,20-dione and 6α-methyl-9α-fluoro-11β-hydroxy-17,21-epoxy-4-pregnene-3,20-dione was chromatographed over 200 grams of Florisil anhydrous magnesium silicate, taking the following fractions of 400 milliliters each (Table I):

TABLE I

| Fractions | Solvent |
|---|---|
| 1 | methylene chloride. |
| 2-6 | 10% acetone—90% Skellysolve B (hexanes). |
| 7-11 | 12.5% acetone—87.5% Skellysolve B. |
| 12-19 | 15% acetone—85% Skellysolve B. |
| 20 | 100% acetone. |

Fractions 2-16 were combined and recrystallized from acetone-Skellysolve B hexanes, removing a crop of insoluble material. The residue, remaining after evaporation of the filtrate, was combined with the residue of fraction 1 and again chromatographed from methylene chloride on 200 grams of Florisil, taking fractions of 350 milliliters as follows in Table II:

TABLE II

| Fractions | Solvent |
|---|---|
| 1-4 | 5% acetone—95% Skellysolve B. |
| 5-8 | 7.5% acetone—92.5% Skellysolve B. |
| 9-12 | 10% acetone—90% Skellysolve B. |
| 13-16 | 15% acetone—85% Skellysolve B. |
| 17 | 100% acetone. |

Fractions 8 to 10 were combined, evaporated and recrystallized twice from acetone-Skellysolve B hexanes to give 0.48 gram of 6α-methyl-9α-fluoro-11β-hydroxy-17α,-

21-epoxy-4-pregnene-3,20-dione of melting point 203 to 205 degrees centigrade and an infra-red spectrum, measured in mineral oil (trademark Nujol), showing maxima at 3340, 1802, 1637, 1600, 960, and 870 cm.$^{-1}$.

*Analysis.*—Calculated for $C_{22}H_{29}O_4F$: C, 70.19; H, 7.76; F, 5.05. Found: C, 70.11; H, 7.67; F, 4.56.

In the same manner as shown in Example 1, 6α-methyl-9α-fluoro-17α,21-dihydroxy-4-pregnene-3,11,20-trione 21-toluenesulfonate was dissolved in dimethyl formamide and heated with potassium fluoride to give 6α-methyl-9α-fluoro-17α,21-epoxy-4-pregnene-3,11,20-trione. Submitting other 6α-alkyl- or 6β-alkyl-9α-fluoro-11β,17α,21-trihydroxy-4-pregnene-3,20-dione methanesulfonates or 11-keto analogues thereof to the reaction of potassium fluoride, at reflux temperature, in an organic solvent produces the corresponding 6-alkyl-9α-fluoro-11β-hydroxy-17α,21-epoxy-4-pregnene-3,20-dione or 11-keto analogues thereof which are recovered by chromatography as shown before.

EXAMPLE 2

*6α-methyl-9α-fluoro-11β-hydroxy-17α,21-epoxy-1,4-pregnadiene-3,20-dione*

A solution was prepared containing 0.195 gram of 6α-methyl-9α-fluoro-11β,17α,21-trihydroxy-1,4-pregnadiene-3,20-dione 21-methanesulfonate in four milliliters of dimethylsulfoxide. To this solution was added 120 milligrams of potassium fluoride and the resulting suspension was stirred and heated on the steam bath for a period of twenty hours. The mixture was then cooled, poured into 100 milliliters of water, and extracted with ethyl acetate. The ethyl acetate extract was washed with 5% sodium bicarbonate solution and then with water, and was finally dried and evaporated to dryness. The residue of 170 milligrams was dissolved in fifty milliliters of methylene chloride and chromatographed over fifteen grams of Florisil taking fractions of thirty milliliters each as follows:

TABLE III

| Fractions | Solvent |
|---|---|
| 1 | methylene chloride. |
| 2–6 | Skellysolve B—10% acetone. |
| 7–11 | Skellysolve B—12% acetone. |
| 12–16 | Skellysolve B—15% acetone. |
| 17–21 | Skellysolve B—20% acetone. |
| 22–23 | Acetone. |

Fractions 5 through 11 were combined and evaporated to give 41 milligrams of solids which were recrystallized from acetone-Skellysolve B hexanes to give 32 milligrams of 6α-methyl-9α-fluoro-11β-hydroxy-17α,21-epoxy-1,4-pregnadiene-3,20-dione of melting point 213 to 226 degrees centigrade. This material was purified by two additional recrystallizations from Skellysolve hexane to give an analytical sample which melted at 238–243 degrees centigrade and had a rotation of $[\alpha]_D$ +150 degrees in acetone.

*Analysis.*—Calcd.: for $C_{22}H_{27}O_4F$: C, 70.56; H, 7.27; F, 5.18. Found: C, 70.61; H, 6.95; F, 5.06.

In the same manner as shown in Example 2, heating 6α-methyl-9α-fluoro-17α,21-dihydroxy-1,4-pregnadiene-3,11,20-trione 21-methanesulfonate in dimethylsulfoxide, with potassium fluoride, produces 6α-methyl-9α-fluoro-17α,21-epoxy-1,4-pregnadiene-3,11,20-trione.

In the same manner as shown for 6α-methyl-9α-fluoro-11β-hydroxy-17α,21-epoxy-1,4-pregnadiene-3,20-dione the corresponding 6β-methyl epimers and other 6α- and 6β-alkyl-9α-fluoro-11β-hydroxy-17α,21-epoxy-1,4-pregnadiene-3,20-diones and the corresponding 11-keto analogues thereof, can be prepared by reacting 6β-methyl or the corresponding 6-alkyl-9α-fluoro-11β,17α,21-trihydroxy-1,4-pregnadiene-3,20-dione 21-organic sulfonates in dimethylsulfoxide or dimethyl formamide in the presence of potassium fluoride.

EXAMPLE 3

*6α-methyl-9α-fluoro-11β-hydroxy-17α,21-epoxy-4-pregnene-3,20-dione from 6α-methyl-9α-fluoro-11β,17α-dihydroxy-21-iodo-4-pregnene-3,20-dione*

A solution was prepared containing 47.5 grams of silver nitrate, dissolved in 200 milliliters of water. Thereto was added, under stirring, 13.95 grams of anhydrous sodium carbonate. The resulting precipitate was filtered and washed with water until no silver ions could be detected.

The thusly obtained fresh silver carbonate was added to a solution containing fourteen grams of 6α-methyl-9α-fluoro-11β,17α-dihydroxy-21-iodo-4-pregnene-3,20-dione in 270 milliliters of acetonitrile. The mixture was heated under reflux for a period of two hours under continuous stirring. Thereafter the reaction mixture was cooled and filtered through Celite diatomaceous earth. The Celite filter bed was washed with two fifty-milliliter portions of hot acetonitrile and the washings were added to the filtrate. The filtrate was then dried over anhydrous sodium sulfate, and evaporated to dryness to give about 12.3 grams of light brown solids. The thus obtained light brown solids were redissolved in 450 milliliters of dichloride and poured through 900 grams of hydrochloric acid washed alumina. The material was chromatographed from the alumina column by taking: two fractions with 500 milliliters of benzene, four fractions with benzene and one percent ethyl acetate, four fractions of benzene and two percent ethyl acetate, four fractions of benzene with five percent ethyl acetate and four fractions of benzene and 10% ethyl acetate. The fractions containing from 1 to 5% ethyl acetate and the benzene fraction were discarded. The fraction containing 10% ethyl acetate were combined and evaporated to give 7.1 grams of 6α-methyl-9α-fluoro-11β-hydroxy-17α,21-epoxy-4-pregnene-3,20-dione. The material was further purified by recrystallization from acetone to give pure 6α-methyl-9α-fluoro-11β-hydroxy-17α,21-epoxy-4-pregnene-3,20-dione of melting point 205 degress centigrade.

In the same manner as shown in Example 3, reacting 6α-methyl-9α-fluoro-11β,17α-dihydroxy-21-iodo-1,4-pregnadiene-3,20-dione with silver carbonate in acetonitrile, at reflux temperature, for 150 minutes, yielded 6α-methyl-9α-fluoro-11β-hydroxy-17α,21-epoxy-1,4-pregnadiene-3,20-dione.

Instead of silver carbonate, sodium or potassium carbonate, sodium or potassium bicarbonate, sodium or potassium hydroxide, calcium hydroxide, barium hydroxide, thallous carbonate and the like may be substituted for the silver carbonate in Example 3.

In the same manner given in Example 3, using as starting material, 6α-methyl-9α-fluoro-17α-hydroxy-21-iodo-1,4-pregnadiene-3,11,20-trione results in a yield of 55 to 58 percent of 6α-methyl-9α-fluoro-17α,21-epoxy-1,4-pregnadiene-3,11,20-trione.

Instead of 6α-methyl-9α-fluoro-11β,17α-dihydroxy-21-iodo-1,4-pregandiene-3,20-dione, other 6α- and 6β-alkyl substituted 11-oxygenated 9α-fluoro-17β-hydroxy-21-iodo-1,4-pregnadiene-3,20-diones can be used to give the corresponding 17,21-epoxy compounds.

We claim:

1. 6α-methyl-9α-fluoro-11β-hydroxy-17α,21-epoxy-4-pregnene-3,20-dione.

2. 6α-methyl-9α-fluoro-11β-hydroxy-17α,21-epoxy-1,4-pregnadiene-3,20-dione.

References Cited in the file of this patent

UNITED STATES PATENTS

| 2,836,593 | Beyler et al. | May 27, 1958 |
| 2,865,915 | Bailey et al. | Dec. 23, 1958 |
| 2,903,449 | Fried et al. | Sept. 8, 1959 |
| 2,932,640 | Bailey et al. | Apr. 12, 1960 |

OTHER REFERENCES

JACS, vol. 78, September 20, 1956, pages 4812–4814.